United States Patent [19]
Fritz et al.

[11] 3,960,594
[45] June 1, 1976

[54] PRIMARY OR SECONDARY ELECTROCHEMICAL CELL

[75] Inventors: Heinz Peter Fritz, Munich; Jürgen Besenhard, Neusaess, both of Germany

[73] Assignee: Rheinisch-Westfalisches Elektrizitatswerk Aktiengesellschaft, Essen, Germany

[22] Filed: Nov. 5, 1973

[21] Appl. No.: 412,678

[30] Foreign Application Priority Data
Nov. 9, 1972 Germany............................ 2254870

[52] U.S. Cl........................... 136/6 LN; 136/100 R; 136/155
[51] Int. Cl.².......................................... H01M 10/00
[58] Field of Search ............... 136/6 LN, 20, 100 R, 136/83, 154, 155

[56] References Cited
UNITED STATES PATENTS

| | | | |
|---|---|---|---|
| 3,433,672 | 3/1969 | Scholzel | 136/6 LN |
| 3,508,966 | 4/1970 | Eisenberg | 136/6 LN |
| 3,562,017 | 2/1971 | Lyall | 136/6 LN |
| 3,663,295 | 5/1972 | Baker | 136/6 LN |
| 3,778,310 | 12/1973 | Garth | 136/154 |

*Primary Examiner*—Winston A. Douglas
*Assistant Examiner*—John F. Niebling
*Attorney, Agent, or Firm*—Karl F. Ross; Herbert Dubno

[57] ABSTRACT

A primary or secondary electrochemical cell having a negative electrode consisting of a light metal or an alloy predominantly consisting of a light metal (especially lithium), a nonaqueous aprotic preferably organic electrolyte, and a positive electrode which consists at least predominantly of a metal or metalloid which is capable of electrochemically forming an intermetallic compound with the light metal upon cathodic liberation thereof. The positive electrode may consist of, at least in major part, arsenic, antimony or other semimetal, metalloid or semiconductor.

5 Claims, 1 Drawing Figure

U.S. Patent June 1, 1976 3,960,594
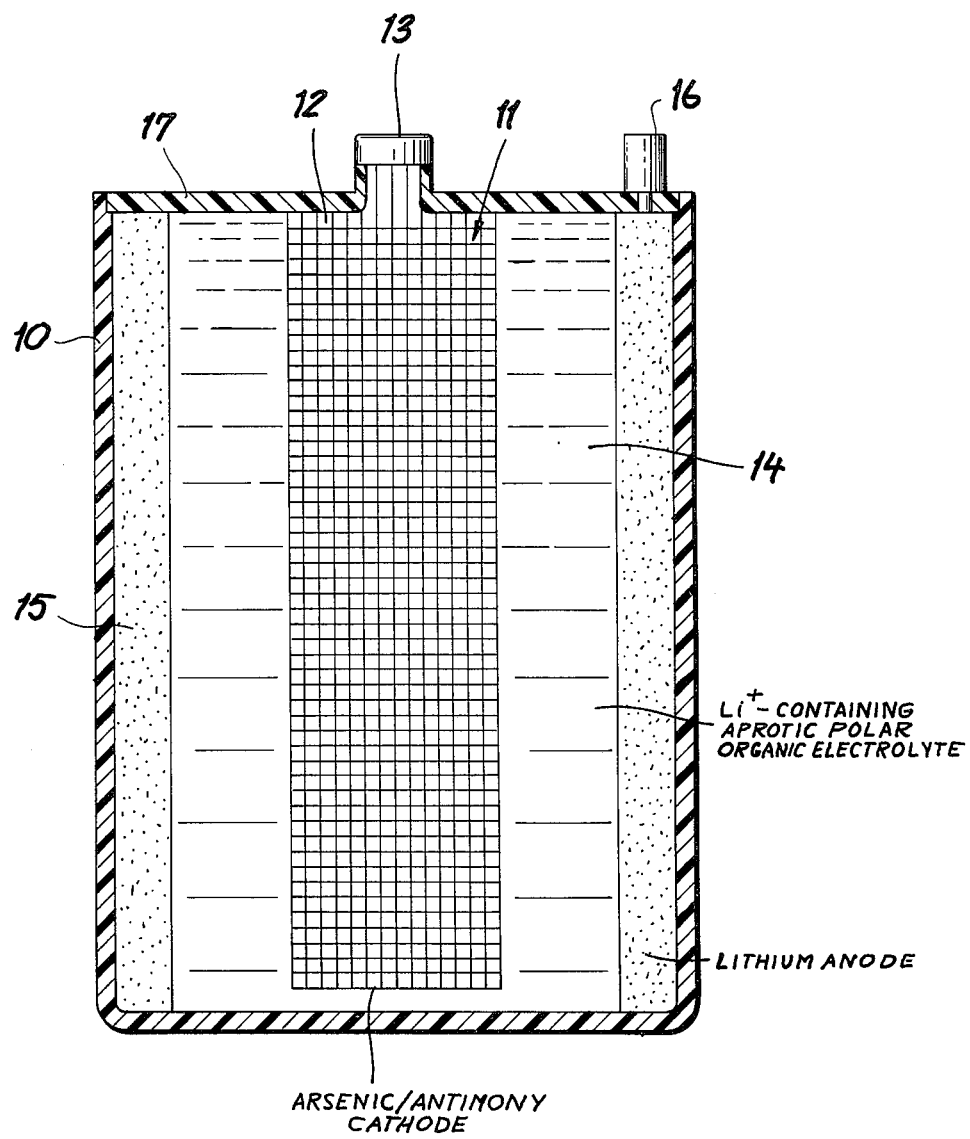

PRIMARY OR SECONDARY ELECTROCHEMICAL CELL

FIELD OF THE INVENTION

The present invention relates to galvanic elements and, more particularly, to current-generating electrochemical cells of the primary or secondary type. More specifically, the invention relates to such cells having as the negative electrode (in the chargeable state) an electrode consisting at least in major part of a light metal such a lithium.

BACKGROUND OF THE INVENTION

Electrochemical current-generating cells using a light metal anode or negative electrode (in the charged state of the cell) and an aprotic organic electrolyte have generally made use of cathodes (positive electrodes in the charged state of the cell) which consist of mixtures of an active material (e.g. an halogenide, oxide, rhodanide or sulfide of a transition metal, other low-solubility simple or complex salts of the transition metals, sulfur, graphite-fluoride or such organic depolarizers as nitro, nitroso, N-halogeno or quinoidal compounds) with an electrically conductive inert material such as graphite or metal powder.

A satisfactory mechanical stability of such electrodes is obtained by mixing them with synthetic-resin binders and/or by consolidating them under elevated pressure and/or by subjecting them to a temperature treatment designed to prevent distortion in use. The additives to the active material, namely, the syntheticresin binder and conductive inert materials markedly reduce the energy density of the cathode and the latter have significantly poor storage capability.

In the following discussion, reference will be made to primary cells or elements and these are to be understood as designating single-use cells in which chemical energy is converted to electrical energy and the cell is not rechargeable or is only limitedly rechargeable. A secondary cell is one which is rechargeable in the sense that application of electrical energy to the cell reverses the electrochemical process so that a subsequent discharge may again by carried out to produce electrical energy.

The "light metals" within the ambit of the present disclosure are those to be found in the second and third period, groups IA, IIA and IIIA of the Periodic Chart of the Elements (pages 448 and 449 of the HANDBOOK OF CHEMISTRY AND PHYSICS, 41st Edition, 1959–1960).

OBJECTS OF THE INVENTION

It is the principal object of the present invention to provide an electrochemical current-generating galvanic element or cell which is free from the disadvantages mentioned above.

Another object of this invention is to provide an electrochemical cell using a light-metal negative electrode or anode, a nonaqueous electrolyte and a cathode which is designed to provide high energy density and improved storage capability by comparison with earlier electrochemical devices using light-metal anodes.

SUMMARY OF THE INVENTION

These objects are attained, in accordance with the present invention, in a galvanic element having a negative electrode consisting of a light metal or a light-metal alloy having a predominance of the light metal, a non-aqueous and preferably organic electrolyte and a positive electrode or cathode which in the chargeable state, consists at least predominantly of a metal or metalloid (semiconductor) forming electrochemical intermetallic compounds with the light metal upon cathodic separation thereof from the anode.

The invention thus resides in providing the positive electrode of the charged cell predominantly of a metalloid which electrochemically reacts with the cathodic liberated light metal to form intermetallic compounds. Put otherwise, the positive electrode comprises a metal or metalloid electrochemically alloyable with the light metal of the negative electrode.

Preferably the light metal of the negative electrode is lithium and best results have been obtained herewith.

Since not only the negative electrode, but also the positive electrode consists of a high conductivity material and is completely insoluble in the static condition of the cell, self-discharge by autosolubilization of parts of the cathode is completely excluded.

The metals or metalloids of the cathode are totally inert chemically in aprotic (proton-free) organic liquids and the same holds true for alkali metals, especially lithium which is completely stable in certain aprotic organic solvents or salt solutions.

A self-discharge of the galvanic cell according to the present invention by reaction of the electrodes with the electrolyte solution is thus also excluded.

Preferably, as noted, the intermetallic compounds contain cathodically liberated lithium and the metal or metalloid of the cathodes, preferably arsenic or antimony or a combination thereof. In general, a non-aqueous electrolyte containing light-metal ions is preferred so that the electrolyte should at least partly solubilize a salt of the light metal (e.g. lithium). Advantageously the electrolyte is an aprotic, polar organic solution of a lithium salt.

The galvanic cell of the present invention has an especially high energy density and significant storage capability and is, moreover, rechargeable so that it can be used as a primary or secondary cell.

In connection with the use of the system as a rechargeable or secondary cell, some comments with respect to the prior art use of lithium in electrochemical systems may be in order. For example, it is known to provide rechargeable cells with, for example, lithium anodes in organic solutions using copper, silver and nickel halides as the cathode. Upon discharge, such cells produce a lithium halide as a discharge product. To prevent polarization of the electrodes by insoluble lithium halide or other lithium salts and to preclude the formation of deposits of lithium salts on the floor of the cell which may reduce the rechargeability, such cells must contain large quantities of electrolyte capable of retaining the lithium salt in solution. The organic solvents, in which such salts are significantly less soluble, are thus disadvantageous by comparison with aqueous electrolytes. The rechargeable cells, moreover, have significant difficulties including those mentioned above of polarization, precipitation and loss of storage capacity.

By contrast with such prior art cells, the cells of the present invention produce no anions in the overall reaction upon charging and discharging. During discharge, the overall reaction can be given as:

$$xLi + yM \xrightarrow{disch.} Li_xM_y \quad (1)$$

whereby lithium, upon the release of energy, is incorporated in the lattice structure of the metalloid M in the form of the alloy or intermetallic compound $$Li_xM_y$$

The overall reaction, of course, reflects the half-reaction at the lithium anode:

$$Li \rightarrow Li^+ + le^- \quad (2)$$

and the half-reaction at the cathode of the metal or metalloid M:

$$M \rightarrow M^{n+} + ne^- \quad (3)$$

Upon charging, the lithium in the intermetallic compound goes back into solution and lithium is deposited at the lithium anode in accordance with the half-reaction $$xLi^+ + xe^- \rightarrow xLi \quad (4)$$

so that, the metal M remaining at the cathode, the overall charging reaction can be given as $$Li_xM_y \xrightarrow{charge} xLi + yM \quad (5)$$

With the cell of the present invention, only a so-called catalytic quantity of the light-metal salt need be incorporated in the electrolyte since all of the lithium, for example, going into an ionic state at one electrode corresponds in an equimolar quantity to the lithium incorporated in the intermetallic compound at the other electrode and vice versa. As a consequence only small quantities of the light-metal salts are necessary and substantially less solvent can be employed than has hitherto been the case. The solvent and salt quantities may be selected in accordance with optimal conductivity characteristics and other practical requirements since the capacity of the cell is not limited thereby. Furthermore, the energy density is close to the theoretical since the metal or metalloid cathode does not have to be provided with binders or electrically conductive inert materials.

It has already been proposed to provide lithium in combination with tin, lead, aluminum, gold, platinum, zinc cadmium, silver mercury and magnesium as electrodes in non-aqueous solutions of lithium salts. However the alloying of lithium with these metals results in a potential drop as compared with elemental lithium which is so small as to be practically unsuitable for use of the couple as an electromechanical energy source. Lithium alloys of this kind, for example with aluminum, are used mostly with organic electrolytes as anodes since the electrochemical potential of the electrode is similar to that of elemental lithium but is free from the disadvantages of elemental lithium.

Surprisingly, according to the present invention, the electrochemical alloying (formation of intermetallic compounds) of lithium and one of the metalloids described above provides a substantially higher potential difference so that, for example, the incorporation of lithium in antimony in a solution of $LiClO_4$ (one molar) in propylene carbonate gives a potential drop of about 0.85 volts from the elemental-lithium potential. The same potential difference is obtained with other organic solvents, such as tetrahydrofurane, dimethylsulfoxide, ethylenediamine and pryidine. The electrode potential (against a reference electrode) of the lithium electrodes and the lithium-antimony electrode are solvent dependent. However, during charging and discharging of the cell, the potential difference is independent of the solvent since the solvation and desolvation energies of the two electrodes have opposite sides and thus do not affect the overall equation. It has also been found that the anion of the lithium salt in the electrolyte does not have any significant function except as a current carrier and can be chosen in accordance with economical anad technical requirements, e.g. to bring about the highest conductivity at lowest cost.

It has been found that, as the metalloid or semiconductor arsenic gives especially high cell voltages at low electrode weight although other metalloids or metals capable of combining with lithium or the other light metals in the manner indicated are suitable.

While we prefer to use aprotic, polar organic electrolytes containing mobile lithium ions, it has been found that fused-salt baths or solid electrolytes containing the $Li^+$ ion may also be employed.

The potential drop of the intermetallic electrode against the free lithium electrode for the lithium-antimony is about 0.9 volts, a value which is approximately obtained also with incorporation of sodium and potassium in arsenic or antimony. The intermetallic compound is probably $Li_3As$ or $Li_3Sb$ and for the lithium/arsenic system a theoretical charging density of 3020As/g is obtained as theoretical while the lithium/antimony system has a theoretical charging density of 2030As/g.

The process is reversible, as indicated, so that the system may be recharged and in both states (charged and discharged) has high stability so that the storage capability of the cell is excellent. An inert spacer between the electrodes should be provided and the system should be protected from contact with moist air.

The anode according to the present invention, may be provided as heretofore with metallic support and conductive grids or additives and the latter may be composed of metal such as nickel or copper which do not electrochemically form alloys with lithium in organic solutions. The lithium is preferably present in stoichiometric excess.

While cathodes can be arsenic or antimony which may be used which are free from additives, the electrical conductivity can be improved by the addition of copper or nickel or by including the antimony or arsenic in grids or supports of these metals. Thermoplastic synthetic resin binder may be added to improve the mechanical stability of the arsenic or antimony electrodes.

DESCRIPTION OF THE DRAWING

The above and other objects, features and advantages of the present invention will become more readily apparent from the following description, reference being made to the accompanying drawing in which the sole FIGURE is an axial cross-section, partly in diagrammatic form, of an electrochemical cell according to the present invention.

SPECIFIC DESCRIPTION

In the drawing we show a cell which comprises an hermetically sealed casing 10 of synthetic-resin or other material chemically inert to the organic electrolyte which is employed. The casing 10 prevents access of moist air to the alkali-metal electrodes of the seal. Within the seal there is provided an arsenic or antimony electrode 11 which may comprise a screen 12 of copper or nickel wire in which the granular arsenic or antimony is placed, the grid or screen 12 having a terminal 13. Surrounding the cathode 11, 12, is a porous body 14 e.g. of glass particles, receiving the organic electrolyte which contains a lithium salt in solution. Coaxially spaced from the cathode 11, 12 is an anode 15 of cylindrical configuration, e.g. consisting of sintered copper or nickel powder or copper or nickel mesh and in which elemental lithium is pressed, e.g. by rolling. A terminal 16 provides the electrical connection to this anode 15 and a nonconductive disk 17 serves to seal the casing 10.

SPECIFIC EXAMPLES

Example I

Elemental antimony and cathode material is introduced into a cylindrical screen of copper serving as a conductor for the cathode and as a mechanical support for the antimony. The elemental anode is formed by rolling lithium metal in a dry atmosphere into a porous sintered copper foil. The lithium is provided in an amount of three moles for each mole of antimony. A fine-porous separator, e.g. sintered glass particles, is provided between the anode and cathode and the electrolyte is a one molar solution of $LiClO_4$ in propylene carbonate. The terminal voltage is 0.85 volts.

Example II

Example I was carried out except that instead of copper, nickel was used as the conductor and support for both the anode and the cathode. The same terminal voltage was obtained.

Example III

Example I was used except that arsenic was substituted for the antimony, the terminal voltage being 0.9 volts.

Example IV

Antimony powder to which copper powder had been added together with about 1 percent by weight of polytetrafluoreoethylene powder was pressed into a copper screen. This cathode was juxtaposed with a flat lithium anode and the results obtained were the same as those of Example I.

Example V

Example IV was used except that nickel was substituted for copper in the cathode and again a terminal voltage of about 0.85 volts was obtained using the electrolyte of Example I.

Example VI

Example IV was followed except that arsenic was substituted for antimony. The terminal voltage was 0.9 volts.

We claim:

1. An electrochemical cell comprising a first electrode consisting at least in major part of lithium; a nonaqueous aprotic polar organic-solvent electrolyte containing ions of dissolved lithium in contact with said first electrode; and a solid second electrode in contact with said electrolyte and consisting at least in major part of arsenic or antimony electrochemically reacting with lithium to form a lithium-arsenic or lithium-antimony intermetallic compound upon cathodic liberation of lithium.

2. The cell defined in claim 1 wherein said electrolyte is an aprotic polar organic solvent containing a lithium salt in solution.

3. The cell defined in claim 2 wherein said solvent is propylene carbonate and said lithium salt is lithium perchlorate.

4. The cell defined in claim 3 wherein said first electrode comprises a copper or nickel conductive structure in which lithium is received.

5. The cell defined in claim 4 wherein said second electrode comprises a copper or nickel conductive structure in which the arsenic or antimony is received.

* * * * *